United States Patent [19]
Bova et al.

[11] Patent Number: 6,000,882
[45] Date of Patent: Dec. 14, 1999

[54] METHODS AND SYSTEMS FOR REMEDIATING CONTAMINATED SOIL

[75] Inventors: John Carl Bova, Portland; Roger Todd Richter, Sherwood, both of Oreg.

[73] Assignee: United Soil Recycling, Woodburn, Oreg.

[21] Appl. No.: 08/984,227

[22] Filed: Dec. 3, 1997

[51] Int. Cl.[6] ........................................ B09C 1/06
[52] U.S. Cl. ............................................. 405/128
[58] Field of Search ......................... 405/128, 131; 588/205, 209, 228, 230, 249, 900; 210/908, 909

[56] References Cited

U.S. PATENT DOCUMENTS

| | | | |
|---|---|---|---|
| 4,842,448 | 6/1989 | Koerner et al. | 405/128 X |
| 5,067,852 | 11/1991 | Plunkett | 405/128 |
| 5,193,934 | 3/1993 | Johnson et al. | 405/128 |
| 5,228,804 | 7/1993 | Balch | 405/128 |
| 5,261,765 | 11/1993 | Nelson | 405/128 |
| 5,265,978 | 11/1993 | Losack | 405/128 |
| 5,340,236 | 8/1994 | Ikenberry | 405/128 |
| 5,836,718 | 11/1998 | Price | 405/128 |

*Primary Examiner*—George Suchfield
*Attorney, Agent, or Firm*—Marger Johnson & McCollom, P.C.

[57] ABSTRACT

A system and method for remediation of contaminated soil removed from a soil site is provided. The contaminated soil is placed upon several layers of perforated heating pipes forming a remediation cell, and the entire cell is covered by a galvanized Quonset Hut-shaped steel building to prevent the escape of vapors from the soil cell. Heating air introduced into perforated heating pipes heat conductively heats the contaminated soil creating a differential pressure area around the heated pipes. This results in the migration of volatilized contaminants and moisture through the perforations in the pipe walls and into the lower pressure area within the heated steel pipes, forcing the contaminants from the soil and into an off-gas treatment system.

19 Claims, 1 Drawing Sheet

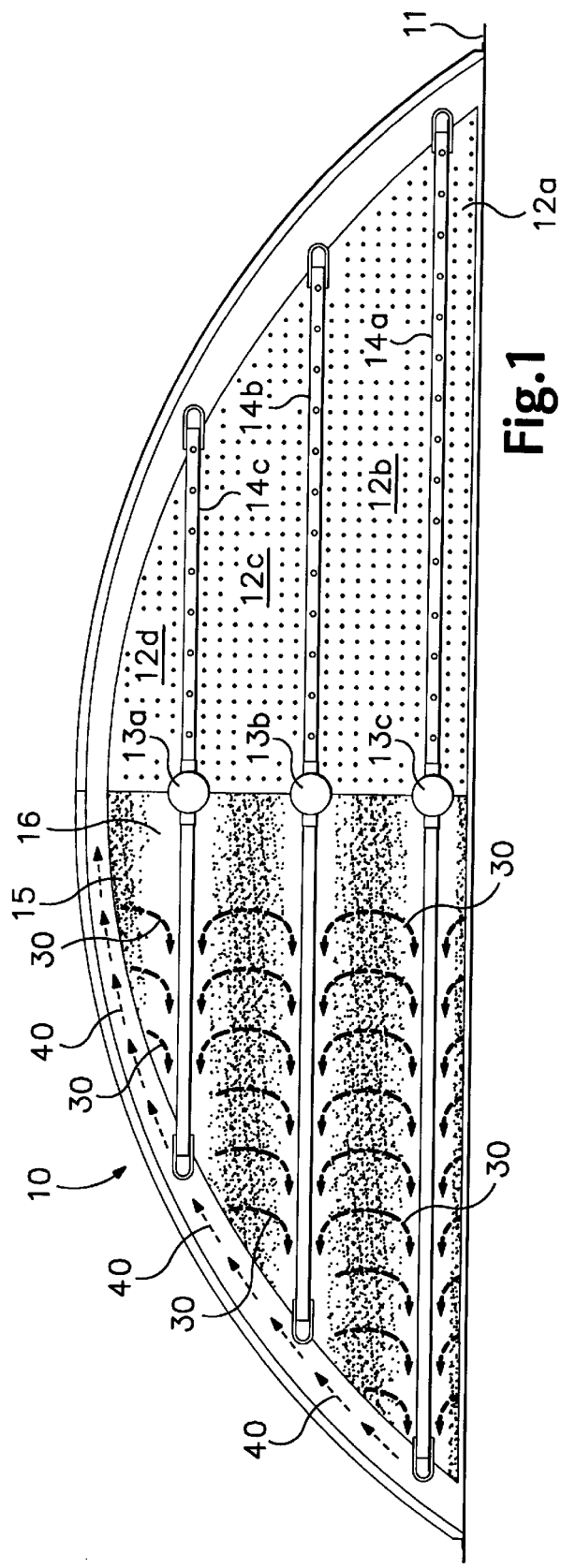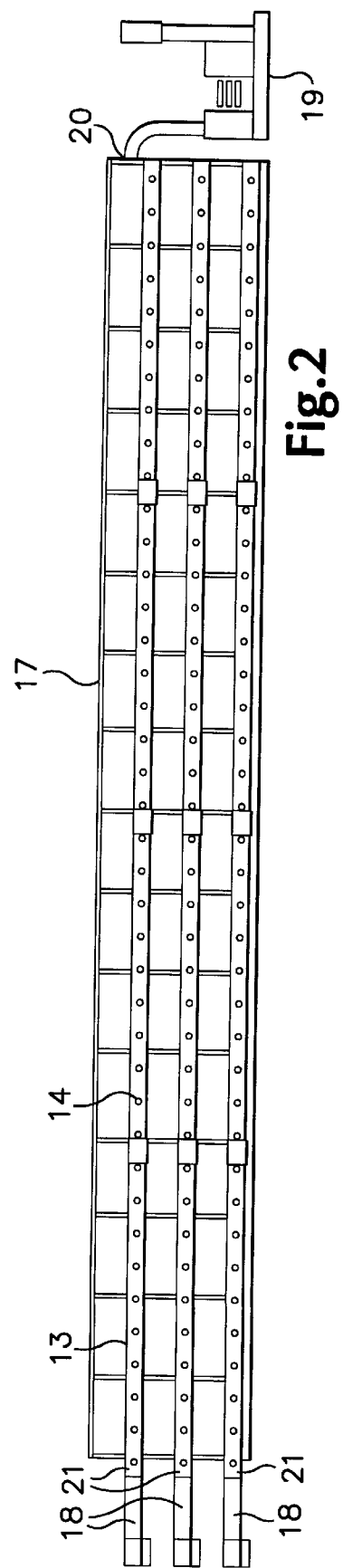

METHODS AND SYSTEMS FOR REMEDIATING CONTAMINATED SOIL

BACKGROUND OF THE INVENTION

The invention relates to methods and systems for remediating contaminated soil, and more particularly to a methods and systems for volatilizing contaminants in the soil and effectively and efficiently removing same therefrom.

Systems for conducting fluid through a soil stack are known. U.S. Pat. No. 4,139,321 describes a rock channel heat storage method involving conduit connections provided within a rock-filled channel. The conduits are used to conduct fluid through the rock pile to either absorb or disperse thermal energy. Soviet Patent 837,997 describes a method for the thermal treatment of embankment soil. A main hold 3 receives heated combusted gas and directs same into spiral holes 5 which are vented through valves 8. U.S. Pat. No. 4,036,285 describes an arrangement to control heat flow between a member and its environment including conduit members which conduct heat transfer fluid underground. Other patents which show devices for conducting fluid through a soil stack include U.S. Pat. Nos. 123,384; 2,332,227; 2,332,227; 3,105,134; 3,564,862; 3,935,900; 5,449,113; Soviet Union 600,262; Soviet Union 996,662; Fed. Rep. Germany 2,706,740

Systems for removing contaminants from the ground are also known. For example, U.S. Pat. No. 4,982,788 removes contaminants from the ground by circulating air between two substantially parallel wells and by removing the vapors of the organic compounds from the circulated air using at least one of a condenser and a demister. U.S. Pat. No. 5,011,329 relates to in situ decontamination by injecting a hot gas into boreholes formed in a contaminated soil area. A method is also provided in U.S. Pat. No. 5,018,576 for in situ decontamination of contaminated subsurface areas by injection of steam into injection wells and withdrawing of liquids and vapors from the wells under sub-atmospheric pressure.

Systems have also known for removing contaminants from soil piles or soil stacks. U.S. Pat. No. 4,973,811 relates generally to in situ decontamination of soil using radio frequency induction heating. In U.S. Pat. No. 5,035,537, soil, porous rock, and similar contaminated materials are gathered, dispersed uniformly on a horizontal surface, and treated with an emulsifying agent.

U.S. Pat. No. 5,067,852 relates to a method and apparatus for removing volatile contaminants from contaminated soil which has been stacked onto a first vapor-tight liner. A first set of air distribution pipes disposed within the soil stack each of which has an opened end, a closed end, and a plurality of perforations located in the body of the pipes. An air stream is introduced into the open end of the distribution pipes and exits the distribution pipes through the perforations and into the contaminated soil stack. The air flows from the distribution pipes, through the contaminated soil, and volatilizes contaminants within the contaminated soil. The air flow from the distribution pipes employees a gravel filter medium to prevent the perforations in the distribution pipes from clogging. The volatized vapor created as a result of the induced air flow is carried by the air flow through the soil, and is exhausted from the soil. The volatilized vapors exiting the soil stack are disposed of through an external vapor treatment system. A second vapor-tight liner is placed over the soil stack to creating an impervious enclosure between the respective first and second liners, which are typically formed of a polyethylene film. In order to avoid melting of the first and/or second liners, the temperature of the soil stack would have to be maintained below the melting temperature of the respective liners.

U.S. Pat. No. 5,213,445 and U.S. Pat. No. 5,340,236 are directed to a similar process to US '852 except that they provide a recirculating system which destroys the contaminant phase and returns heated decontaminated air to the air distributions pipes. The air heating unit, which is located outside of the soil stack, heats the air to temperature of between 275 and 300 degrees F.

The above-described methods and systems, which are incorporated herein by reference, have a number of drawbacks. They are closed loop systems which recirculates a substantial portion of the heated air after the contaminants are burned or removed. Recirculation of air through heaters reduces oxygen in the air stream thereby reducing the effective level of volatilization. These systems of US '852, US '445 and US '236 make use of a vacuum to encourage contaminants to achieve vapor phase which has proven to be an ineffective approach for affecting remediation. As previously stated, the temperature of the volatizing air must be maintained below the melting temperature of the sealing member in order maintain its structural integrity. The above prior art systems are designed to move the vaporized contaminants through the soil stack into the space thereabove surrounded by the flexible sealing member. Therefore, the soil cannot be packed down to maintain the structural integrity of the soil stack without adversely effecting the efficiency of the remediation process.

SUMMARY OF THE INVENTION

The above-described have been met by the system and methods of the present invention.

The subject invention is not a closed loop system as indicated in U.S. Pat. Nos. 5,213,445 and 5,067,832. The system and method of this invention also does not make use of a vacuum to encourage contaminants to achieve vapor phase. The system and method herein are designed to treat both volatile and semi-volatile contaminants as well as a wide variety of soil types (frozen, very wet, high clay content, etc.) And, unlike the prior art systems and methods, in the process and method of this invention, soil can be packed down without decreasing the efficiency of the system.

More specifically, the present invention is directed to systems and methods for expurgating contaminants from contaminated soil removed from a soil site and to systems and methods for remediating contaminated soil removed from a soil site. Thus, the subject systems and methods can comprise forming a multi-layer soil remediation cell having a plurality of adjacent layers of contaminated soil, and a plurality of dual-function perforated pipes located between the adjacent layers of contaminated soil.

Then, a high temperature air is introduced into the contaminated soil through the dual-function perforated pipes. Preferably, the high temperature air is heated to a temperature of at least about 800 degree F., more preferably at least about 1000 degree F., and most preferably at least about 1200 degree F. Extremely high temperature can also be employed depending on the temperature limitations of the dual-function perforated pipes and the covering. Thus, in cases where a dual-function perforated pipes and covering are used which can withstand extremely high temperatures, i.e., from 2,000 up to 3,000 degrees F., a corresponding extremely high temperature air supply can be employed In this way, the first function can be imparted to the contaminated soil, namely, volatilizing the contaminants located within the contaminated soil thereby producing a contaminated vapor.

This will typically cause the contaminated soil to be heated to an average temperature of at least about 212 degree F., preferably to an average temperature of at least about 250 degree F., more preferably to an average temperature of at least about 300 degree F., and most preferably to an average temperature of at least about 350 degree F.

Next, the second function of the dual-function perforated pipes is facilitated, namely, removing the contaminated vapor from within the multi-layer soil remediation cell through the dual-function perforated pipes. Preferably, this second function is accomplished by conductively volatilizing the contaminated soil with the high temperature air, and thereby moving the contaminated vapors produced into and through the dual-function perforated pipes (and into and through the chamber and into an off-gas treatment unit, such as a burn chamber, as hereinafter described) due to a pressure differential created by the high temperature air within the contaminated soil. In this systems, it is not the air moving through the soil which volatilized the contaminants but rather the conductive heating of the soil. Vapors do not move through the soil to the top of the soil cell but rather into the perforated pipes, down the pipes and into the vapor hold chamber formed between the cell and the covering, which is preferably a steel-fabricated building.

When the contaminated vapor is removed from within the multi-layer soil remediation cell it substantially reduces the moisture level in the contaminated soil, preferably to an average moisture level of less than about 5% by weight, more preferably to an average moisture level of less than about 2% by weight, and most preferably to an average moisture level of less than about 1% by weight.

A high temperature covering is provided about the multi-layer soil remediation cell having an entry opening at one end of the covering in communication with the dual-function perforated pipes. The covering is disposed over the multi-layer soil remediation cell, a vapor holding chamber being formed therebetween. An exit opening is provided at the other end of the covering in communication with an off-gas treatment unit. The off-gas treatment unit is employed for collecting and/or destroying the contaminants in the contaminated vapors.

The contaminated vapor is released from the dual-function perforated pipes through the entry opening into, and collecting the contaminated vapor within, the vapor holding chamber. The system of the present invention can further include means for controlling the amount of contaminated vapor that flows from the dual-function perforated pipes into the chamber. The collected contaminated vapor is released from the vapor holding chamber through the exit opening and passes into the burn chamber.

The system can further include high temperature air supply pipes within the multi-layer soil remediation cell for transferring the high temperature air to the dual-function perforated pipes. Preferably, the air supply header pipes are buried within the center. They can also run the length of the soil cell. Each header pipe can have a plurality of air supply connections extending therefrom to both sides of the soil cell.

The system of present invention is typically designed so that the high temperature air passes within the contaminated vapors through the exit opening without recirculating the high temperature air to the multi-layer soil remediation cell. In other words, the subject system is preferably configured for a single-pass remediation operation.

The foregoing and other objects, features and advantages of the invention will become more readily apparent from the following detailed description of a preferred embodiment which proceeds with reference to the drawings.

BRIEF DESCRIPTION OF THE DRAWINGS

FIG. 1 is a schematic end view of the system 10 of the present invention.

FIG. 2 is a schematic view of the system 10 of FIG. 1.

DETAILED DESCRIPTION OF A PREFERRED EMBODIMENT

Referring now to FIG. 1, a system denoted "1" is provided for remediation of contaminated soil removed from a soil site. System 1 comprises a multi-layer soil remediation cell denoted "10" formed of a plurality of adjacent layers of contaminated soil, and a plurality of dual-function perforated pipes located between the adjacent layers of contaminated soil.

System 1 is formed by placing a polymeric liner sheet 11, typically a polyethylene liner, on the ground. Generally a rectangular work area, such as a 36'×80' area, is laid out. A first layer of soil 12a is placed upon the liner. A layer twelve inches thick can be employed for this purpose.

Then, air supply pipes 13a, preferably 12" OD, are placed in the center of the soil layer 12a running the length of the layer 12a. Dual-function perforated heating pipes 14a, in the form of 4" steel heating prods, are connected to the air supply pipes 13.

A second layer of soil 12b (30" thick) is placed upon the heating pipes 14a. Another layer of air supply pipes 13b and heating pipes 14b are placed upon the soil 12b. A third layer of soil 12c (30" thick) is placed upon the heating pipes 14b. Another layer of air supply pipes 13c and heating pipes 14c are placed upon the soil 12c. Finally, a fourth layer of soil 12d (18" thick) is placed upon the heating pipes 14c. It is understood that the quantity, size and relative configuration, etc., of supply pipes, heating pipes and soil layers can vary depending on circumstances involved in a given remediation situation.

A Quonset Hut-shaped metal building 17 is assembled in 5' sections and forms a covering for the entire soil cell. The temperature range of the heated air can reach up to 2500 F. without compromising the integrity of the sealing member.

Heaters 18 are attached at the inlet end of the air supply pipes 13a–13c at each soil layer 12a–12d. Heaters 18 which supply air to the air supply pipes are fueled with fuel oil, diesel, propane, butane or natural gas. The preferred heaters 18 are the propane burners used for burning alfalfa ("Burners"), which are numerically denoted as "10", in US 4,644,683 to Darrell R. Jones ("U.S. Pat. No. '683"). US '683 is incorporated herein in its entirety by reference. The Burners are pictorially illustrated in FIGS. 4–9 of US '683 and are specifically described beginning at column 3, line 6 of US '683. An exemplary Burner is The Inferno manufactured by Inferno Burner Company of Clackamas, Oreg. The Inferno Burner puts out 300,000 to 1.5 million BTU's, in a CFM range of 1,000 to 6,000, at a exhaust temperature of 800 to 2500 degree F.

High temperature air is forced into the air supply pipes 13 at temperatures up to 2500 degrees F. at point 21. Air supply pipes 13 are manufactured from steel (approximately 20 gauge) so to prevent damage from heavy equipment and/or settling of soil.

An off-gas treatment unit 19 is employed herein to destroy the contaminants in the contaminated vapor stream. An exemplary off-gas treatment unit 19 volatizes contaminants which are preferably drawn into and through a catalytic oxidizer and destroyed. The off-gas treatment unit 19 is connected to a vent 20 at the exit of the Quonset Hut 17 opposite the heaters. Generally, a blower, such as a 25-HP, 3-phase, 220 volt Dayton blower, draws the contaminated air out of the Quonset hut and through a catalytic converter bank. It is then vented to the atmosphere. The blower is preferably a high-pressure radial blade industrial blower with a wheel diameter of 25"–30". A typical blower should be capable of producing 3600-CFM air delivery at 12 inches of static pressure. The catalytic converters are preferably a bank (such as a dozen or more converters) of Walker Exhaust Catalytic Converter Units (Model No. 15174 for example) generally arranged in parallel with respect to each other.

This system is designed to allow treatment of soil cells 25 cubic yards to 1500 cubic yards in volume. The entire system can be loaded upon a 45 foot flatbed trailer to be transported from site to sit. A remediation system which is characterized by its ability to remediate over 5 tons of soil per hour with less than 7 moving parts.

In operation, as described in FIGS. 1 and 2, heaters 18 are turned on and air is heated to its supply temperature. The hot air is introduced at point 18 into hot air supply pipes 13$a$–$c$ which in turn feed the hot air to heating pipes 14$a$–$c$, respectively. As shown in FIG. 1 the hot air exits heating pipes 14$a$–$c$ where it is introducing into contaminated soil 15. Heat and water produce steam which creates high pressure areas in contaminated soil 15. The contaminated soil 15 is then dehydrated by the heated air and forms areas of lower pressure dehydrated soil 16. The dehydrated soil 16 substantially surrounds the heating pipes 14$a$–$c$. The difference in pressure between the respective high and low pressure areas forces contaminated air, depicted as arrows "30", through dehydrated soil 16 and into the heating pipes 14$a$–$c$ where it flows, depicted as arrows "40", into the space formed between covering 17 and cell 10, where it is forced into the off-gas treatment unit 20, which is preferably catalytic oxidizer unit.

Having illustrated and described the principles of my invention in a preferred embodiment thereof, it should be readily apparent to those skilled in the art that the invention can be modified in arrangement and detail without departing from such principals. I claim all modifications coming within the spirit and scope of the accompanying claims.

We claim:

1. A system for remediation of contaminated soil removed from a soil site, comprising:
    a multi-layer soil remediation cell formed of a plurality of adjacent layers of contaminated soil, and a plurality of dual-function perforated pipes located between the adjacent layers of contaminated soil,
    said dual-function perforated pipes acting as (a) heating prods for introducing high temperature air into the contaminated soil for volatilizing the contaminants located within the contaminated soil thereby producing a contaminated vapor, and (b) flow channels for removing said contaminated vapor from within said multi-layer soil remediation cell;
    a high temperature covering, located about said multi-layer soil remediation cell, having an entry opening in communication with said dual-function perforated pipes, an exit opening in communication with a burn chamber, and forming a chamber over said multi-layer soil remediation cell which receives and collects in said chamber said contaminated vapor which have been released from said dual-function perforated pipes and passes through said entry opening; and
    said burn chamber collecting and/or destroying contaminants in said contaminated vapors which are released from said storage chamber and passes through said exit opening.

2. The system of claim 1, wherein the high temperature air conductively volatilizes the contaminated soil and moves the contaminated vapors into and through the dual-function perforated pipes, into and through the chamber, and into the burn chamber, due to a pressure differential created by the high temperature air within the contaminated soil.

3. The system of claim 1, wherein the temperature of the high temperature air is at least about 800 degree F.

4. The system of claim 1, wherein the temperature of the high temperature air is at least about 1000 degree F.

5. The system of claim 1, wherein the contaminated soil is heated to an average temperature at least about 212 degree F.

6. The system of claim 1, the contaminated soil, after removing said contaminated vapor from within said multi-layer soil remediation cell, has an average moisture level of less than about 5% by weight.

7. The system of claim 1, which further includes high temperature air supply pipes located within said multi-layer soil remediation cell for transferring said high temperature air to said dual-function perforated pipes.

8. The system of claim 7, wherein the air supply pipes are buried within and extend the entire length of the soil cell.

9. The system of claim 1, wherein said contaminated vapors, after destroying said contaminants, is not recirculated to said multi-layer soil remediation cell.

10. A method for remediating of contaminated soil removed from a soil site, comprising:
    forming a multi-layer soil remediation cell having a plurality of adjacent layers of contaminated soil, and a plurality of dual-function perforated pipes located between the adjacent layers of contaminated soil,
    introducing high temperature air into the contaminated soil through said dual-function perforated pipes and volatilizing the contaminants located within the contaminated soil thereby producing a contaminated vapor;
    providing a high temperature covering about said multi-layer soil remediation cell having an entry opening in communication with said dual-function perforated pipes, an exit opening in communication with a burn chamber, and forming a chamber over said multi-layer soil remediation cell;
    removing said contaminated vapor from within said multi-layer soil remediation cell through said dual-function perforated pipes;
    releasing said contaminated vapor through said entry opening into, and collecting said contaminated vapor within, said chamber; and
    passing said collected contaminated vapor from said chamber through said exit opening; and
    collecting and/or destroying said contaminants in said contaminated vapors.

11. The method of claim 10, which further includes conductively volatilizing the contaminated soil with the high temperature air, and moving the contaminated vapors produced thereby into and through the dual-function perforated pipes, into and through the chamber, and into the burn chamber, due to a pressure differential created by the high temperature air within the contaminated soil.

12. The method of claim 10, which further includes heating the high temperature air to a temperature of at least about 800 degree F.

13. The method of claim 10, which further includes heating the high temperature air to a temperature of at least about 1000 degree F.

14. The method of claim 10, which further includes heating the contaminated soil is heated to an average temperature at least about 212 degree F.

15. The method of claim 11, which further includes removing said contaminated vapor from within said multi-layer soil remediation cell to form contaminated soil having an average moisture level of less than about 5% by weight.

16. The method of claim 10, which further includes providing high temperature air supply pipes within said multi-layer soil remediation cell for transferring said high temperature air to said dual-function perforated pipes.

17. The method of claim 16, which further includes burying the air supply pipes within the soil cell so that the pipes extend the entire length of the soil cell.

18. The system of claim 10, which further includes passing said high temperature air with said contaminated vapors through said exit opening without recirculating said high temperature air to said multi-layer soil remediation cell.

19. A method for expurgating contaminants from contaminated soil removed from a soil site, comprising:

forming a multi-layer soil remediation cell having a plurality of adjacent layers of said contaminated soil, and a plurality of dual-function perforated pipes located between the adjacent layers of said contaminated soil, introducing high temperature air into the contaminated soil through said dual-function perforated pipes and volatilizing the contaminants located within the contaminated soil thereby producing a contaminated vapor; and removing said contaminated vapor from within said multi-layer soil remediation cell through said dual-function perforated pipes thereby expurgating said contaminants from said contaminated soil.

* * * * *